(12) United States Patent
Hund et al.

(10) Patent No.: US 12,043,676 B2
(45) Date of Patent: Jul. 23, 2024

(54) METHOD FOR PRODUCING ANIONIC POLYMERS AND USE AS RESISTANCE AGENTS IN A PAPER-MAKING METHOD

(71) Applicant: S.P.C.M. SA, Andrezieux-Boutheon (FR)

(72) Inventors: René Hund, Andrezieux (FR); Cyril Barriere, Andrezieux (FR); Rémi Olivier, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 905 days.

(21) Appl. No.: 17/043,030

(22) PCT Filed: Mar. 29, 2019

(86) PCT No.: PCT/EP2019/057978
§ 371 (c)(1),
(2) Date: Sep. 29, 2020

(87) PCT Pub. No.: WO2019/185858
PCT Pub. Date: Oct. 3, 2019

(65) Prior Publication Data
US 2021/0102008 A1    Apr. 8, 2021

(30) Foreign Application Priority Data

Mar. 30, 2018   (FR) ...................... 1852813

(51) Int. Cl.
| | |
|---|---|
| *C08F 2/16* | (2006.01) |
| *C08F 8/28* | (2006.01) |
| *C08F 220/56* | (2006.01) |
| *C08F 220/58* | (2006.01) |
| *C08K 5/07* | (2006.01) |
| *D21H 17/43* | (2006.01) |
| *D21H 21/18* | (2006.01) |

(52) U.S. Cl.
CPC .................. *C08F 2/16* (2013.01); *C08F 8/28* (2013.01); *C08F 220/56* (2013.01); *C08K 5/07* (2013.01); *D21H 17/43* (2013.01); *D21H 21/18* (2013.01); *C08F 220/585* (2020.02)

(58) Field of Classification Search
CPC ....... C08F 8/28; C08F 220/585; C08F 220/56
See application file for complete search history.

(56) References Cited

U.S. PATENT DOCUMENTS

| | | | |
|---|---|---|---|
| 7,641,766 B2 * | 1/2010 | St. John | D21H 21/20 |
| | | | 525/154 |
| 2018/0162966 A1 | 6/2018 | Chen et al. | |
| 2020/0232165 A1* | 7/2020 | Luo | D21H 21/18 |

FOREIGN PATENT DOCUMENTS

| | | | |
|---|---|---|---|
| CN | 107353760 | 11/2017 | |
| JP | 2017-210701 | 11/2017 | |
| WO | WO-0011046 A1 * | 3/2000 | C08F 8/28 |

OTHER PUBLICATIONS

Preliminary Report of INPI Republic Française for FR 1852813 dated Oct. 1, 2018.
International Search Report for PCT/EP2019/057978 dated Apr. 9, 2019.

* cited by examiner

*Primary Examiner* — Brieann R Johnston
(74) *Attorney, Agent, or Firm* — B. Aaron Schulman, Esq.; Stites & Harbison, PLLC

(57) ABSTRACT

The invention relates to a method for producing anionic polymers that are hydrosoluble in an aqueous solution, comprising at least the following successive steps: b) polymerisation, in an aqueous solution, of anionic monomers containing at least 5 mol % of 2-acrylamido-2-methylpropane sulfonic acid and/or one of the salts thereof and optionally non-ionic monomers up to a mass concentration of polymer A of between 5 and 40%, b) addition of at least one aldehyde into the solution produced in step a), and c) acidification to a pH of between 3 and 4 of the solution produced in step b). The invention also relates to the use thereof in a paper-making method.

10 Claims, No Drawings

METHOD FOR PRODUCING ANIONIC POLYMERS AND USE AS RESISTANCE AGENTS IN A PAPER-MAKING METHOD

The invention relates to a novel method for producing water-soluble anionic polymers, products of the reaction between an aldehyde and anionic base polymer comprising at least 5 mol % of 2-acrylamido-2-methylpropane sulfonic acid and/or the salts thereof. A further aspect of the invention concerns a paper-making method using these polymers.

Water-soluble polyacrylamides functionalised by an aldehyde are widely used in paper-making methods in particular to increase the dry strength of the paper produced. These water-soluble polyacrylamides are chiefly manufactured from cationic or amphoteric base polymers. The use of water-soluble anionic polymers would advantageously allow an improvement in paper wet strength. Nevertheless, the obtaining of water-soluble anionic polymers functionalised by an aldehyde has the disadvantage that the acid treatment used to halt the reaction between the aldehyde and base polymer is accompanied by a major drop in viscosity of the aqueous polymer solution. The polymers thus obtained display low application performance.

Unexpectedly, the Applicant has developed a method for obtaining water-soluble anionic polymers functionalised by an aldehyde allowing polymer solutions to be obtained without loss of viscosity when halting the reaction, and a paper-making method using these water-soluble anionic polymers able to afford improved dry and wet strength performance.

In a first aspect, the invention concerns a method for preparing water-soluble anionic polymers in aqueous solution, comprising at least the following successive steps:
a) polymerising anionic monomers, in aqueous solution, comprising at least 5 mol of 2-acrylamido-2-methylpropane sulfonic acid and/or one of the salts thereof and optionally nonionic monomers up to a concentration of polymer A of between 5 and 40 weight %;
b) adding at least one aldehyde to the solution obtained at step a);
c) acidifying the solution obtained at step b) to a pH of between 3 and 4.

The copolymerisation of step a) takes place in any manner known to persons skilled in the art.

Without wishing to be bound by any theory, the inventors have shown that advantageously the presence at step a) of at least 5 mol % of 2-acrylamido-2-methylpropane sulfonic acid and/or one of the salts thereof allows the viscosity of the solution to be maintained constant at step c). In addition, and particularly advantageously, the composition obtained after step c) has increased stability over time.

Preferably, polymer A obtained at step a) comprises between 5 and 30 mol % of anionic monomers including at least 5 mol % of 2-acrylamido-2-methylpropane sulfonic acid and/or one of the salts thereof, and between 70 and 95 mol % of at least one nonionic monomer.

The anionic monomers used at step a), in addition to 2-acrylamido-2-methylpropane sulfonic acid or one of the salts thereof, are preferably selected from among acrylic or methacrylic acid, itaconic acid and/or the salts thereof. Preferably, the salts of the anionic monomers are the sodium salts and the salt of 2-acrylamido-2-methylpropane sulfonic acid is the sodium salt.

In one preferred embodiment, the nonionic monomers at step a) are selected from among acrylamide, methacrylamide, N,N dimethylacrylamide and acrylonitrile.

Preferably, polymer A obtained at step a) is a copolymer of acrylamide and 2-acrylamido-2-methylpropane sulfonic acid and/or the salts thereof. Advantageously, it is a copolymer of sodium 2-acrylamido-2-methylpropane sulfonate and acrylamide. Preferably, this polymer A comprises between 5 and 30 mol % of 2-acrylamido-2-methylpropane sulfonic acid and/or the salts thereof and between 70 and 95 mol % of acrylamide, preferably between 5 and 30 mol % of sodium 2-acrylamido-2-methylpropane sulfonate and between 70 and 95 mol % of acrylamide.

Preferably, step b) is implemented at a temperature of between 19 and 26° C. in a reactor under agitation. Preferably, the pH at the start of the addition is adjusted to between 10 and 11, for example with 10% sodium hydroxide solution. The reaction between the aldehyde and polymer A at step a) is accompanied by an increase in the viscosity of the aqueous solution.

The aldehyde added at step b) is added in a concentration of 1 to 30 weight % relative to polymer A obtained at step a). Preferably, the aldehyde is selected from the group comprising glyoxal, glutaraldehyde, furan-dialdehyde, 2-hydroxyadipaldehyde, succinaldehyde, dialdehyde starch, 2,2 dimethoxyethanal, diepoxy compounds, and combinations thereof. More preferably, the aldehyde is glyoxal.

Step c) is preferably conducted at a temperature of between 19 and 26° C. in a reactor preferably under agitation by addition of an acid e.g. sulfuric acid.

In another preferred embodiment, polymer A obtained at a) can be branched, and for this purpose a radical branching agent can be added at step a), selected in particular from the group comprising methylenebisacrylamide (MBA), ethylene glycol diacrylate, polyethylene glycol dimethacrylate, diacrylamide, cyanomethyl acrylate, vinyloxyethyl acrylate or methacrylate, triallylamine. Preferably, the content of branching agent added at step a) is between 5 and 5000 ppm relative to the mass of polymer.

The present invention also concerns a water-soluble anionic polymer obtained with the method of the invention.

The present invention also concerns a paper-making method using a water-soluble anionic polymer of the invention. Therefore, the invention concerns the use of a water-soluble anionic polymer in a paper-making method.

In the invention, a paper-making method corresponds to a method for manufacturing paper, cardboard or the like, in particular a method for producing a sheet of paper, cardboard or the like.

The water-soluble anionic polymer of the invention can be added in combination with a cationic polymer to increase retaining thereof. The water-soluble anionic polymer of the invention permits increased performance of the cationic resins used for wet strength when associated therewith. The cationic polymers concerned are of PAE type (polyaminopolyamide-epichlorohydrin), polyvinylamines, glyoxalated polyacrylamides, PEI (polyethyleneimine), PA (polyamine-epi), polymers obtained by Hofmann degradation, polyacrylamides and starches. Preferably, the weight ratio between the anionic polymer of the invention and the cationic resins is between 2:1 and 1:10.

In the invention, the water-soluble anionic polymer is added during the paper-making process before or after formation of the sheet of paper, cardboard or the like. Therefore, the contacting of the cellulose material with the polymer of the invention can be performed in different manners and in particular using typical methods known to skilled persons. The water-soluble anionic polymer can be added to the cellulose material in the form of a dilute or non-diluted aqueous solution. It can be applied via impregnation technique or can be directly added to the fibrous suspension at any stage of the paper production method at which dry strength agents are usually added.

For example, the polymer of the invention can be added to the thick stock or thin stock. It can be added to the mixing pump or filtering screen. More preferably, the polymer is added before the headbox.

Preferably, the polymer of the invention is injected industrially into the fibrous suspension i.e. before it is diluted by the white water (thick stock). The consistency of the pulp is approximately 2 to 5 weight % of cellulose fibres.

The paper-making method of the invention can be implemented with any type of paper pulp e.g. virgin fibre pulp (Kraft, Bisulfite), recycled fibres, de-inked pulp, mechanical and thermomechanical pulp.

The final polymer can advantageously be prepared in the vicinity of the paper-making machine.

More preferably, in the paper-making method of the invention, the additive is a water-soluble anionic polymer of the invention derived from the reaction between a polymer A of the invention comprising at least 5 mol % of 2-acrylamido-2-methylpropane sulfonic acid and/or the salts thereof, and between 70 and 95 mol % of acrylamide, and from 1 to 30 weight of glyoxal. Further preferably, the water-soluble anionic polymer is derived from the reaction between a polymer A of the invention composed of 5 to 30 mol % of 2-acrylamido-2-methylpropane sulfonic acid and/or the salts thereof, and 70 to 95 mol % of acrylamide, and from 1 to 30 weight % of glyoxal.

The water-soluble anionic polymers derived from the method of the invention afford improved stability, and in addition the paper-making method using these polymers allows improved performance of paper wet and dry strength. The invention and the advantages arising therefrom follow clearly from the examples of embodiment below.

EXAMPLES OF EMBODIMENT

Protocol for Synthesis of the Compound of the Invention
Synthesis of the Base (Co)Polymer (Copolymer A)

Examples 1 to 3 were performed with a copolymer A of acrylamide and sodium 2-acrylamido-2-methylpropane sulfonate (85:15, mol %). For this purpose, these 2 monomers were placed in a reactor and polymerised in the presence of sodium persulfate and sodium metabisulfite, these catalysts being well known to skilled persons.

In Example 2, polymer A differs from polymers A in Examples 1 and 3 through its branched structure obtained by adding 500 ppm of methylenebisacrylamide (MBA) to the polymerisation reaction.

In all the examples, after polymerisation, the weight concentration of copolymer A was 20 in water.

For the counter-examples (1, 1bis and 2) the base polymer was a copolymer of acrylamide and sodium acrylate (85:15, mol %).

Glyoxalation
End product at 7 weight % in water

A 1000 mL reactor under agitation was charged with 200 g of copolymer A (20 weight % in water) and 430 g of demineralised water. The reactor was equipped with a pH measuring probe. After an agitation time of 10 minutes, the pH was adjusted to 11.3 with sodium hydroxide solution (30 weight % in water). The temperature was held at between 19 and 26° C.

16 g of glyoxal (40 weight % in water) were added. pH checking and monitoring of viscosity allowed a product of 70 cps to be obtained (viscosity on completion of the reaction). When this viscosity is reached, the reaction is halted by lowering the pH to below 3.5 through the addition of sulfuric acid ($H_2SO_4$ 92 weight % in water). The final viscosity and pH were recorded.

The viscometer used was of Brookfield type, with LV1 module and speed of 60 rpm. The pH can be adjusted, after adding glyoxal, with sodium hydroxide solution (10 weight % in water). It is possible to conduct the reaction under controlled pH through continuous addition of 10% sodium hydroxide, but it is also possible to add glyoxal in several fractions.

The end polymer was stored in a climate chamber at 32° C. to evaluate the stability thereof. Daily monitoring of viscosity was carried out until gelling of the product. The product was then unusable. The viscometer used was of Brookfield type, with LV1 module and speed of 60 rpm.

|  | Viscosity of copolymer A (cPs) | Initial viscosity (after adding glyoxal) (cPs) | Viscosity at end of reaction (cPs) | Final viscosity (after adding acid) (cPs) | Kinetics (min) | Stability at 32° C. (days) | pH |
|---|---|---|---|---|---|---|---|
| Counter-example 1 | 1040 | 29 | 70 | 34 | 27 | 12 | 3.1 |
| Counter-example 1 bis | 1040 | 33 | 151 | 70 | 15 | 3 | 3.1 |
| Example 1 | 910 | 25 | 70 | 69 | 35 | 30 | 3.2 |
| Example 2 | 1100 | 30 | 65 | 64 | 29 | 25 | 3.1 |

To carry out Counter-example 1 bis, the reaction was halted at higher viscosity to obtain a final viscosity equivalent to Example 1, after ascertained drop in viscosity.

End Product at 10 Weight % in Water

A 1000 mL reactor under agitation was charged with 355 g of copolymer A (20 weight % in water) and 430 g of demineralised water. The reactor was equipped with a pH measuring probe. After an agitation time of 10 min, the pH was adjusted to 11.3 with sodium hydroxide solution (30 weight % in water). The temperature was held at between 24 and 26° C. 28.5 g of glyoxal (40 weight % in water) were added. pH checking and viscosity monitoring allowed a product to be obtained of 112 cps (viscosity on completion of reaction). When this viscosity is reached, the reaction is halted by lowering the pH to below 3.5 through the addition of sulfuric acid ($H_2SO_4$ 92 weight % in water). The final viscosity and pH were recorded.

The viscometer used was of Brookfield type, with LV1 module and speed of 60 rpm. The pH can be adjusted, after adding glyoxal, with sodium hydroxide solution (10 weight % in water). It is possible to conduct the reaction at controlled pH via continuous addition of 10% sodium hydroxide, but it is also possible to add glyoxal in several fractions.

|  | Viscosity of copolymer A (cPs) | Initial viscosity after adding glyoxal (cPs) | Viscosity at end of reaction (cPs) | Final viscosity after adding acid (cPs) | Kinetics (min) | Stability at 32° C. (days) | pH |
|---|---|---|---|---|---|---|---|
| Counter-example 2 | 1040 | 50 | 111 | 62 | 35 | 7 | 3.4 |
| Example 3 | 910 | 42 | 112 | 110 | 21 | 15 | 3.1 |

In all the examples (end products obtained with the method of the invention), no drop in viscosity was observed at the time of acidification, contrary to the counter-examples. The stability of the polymers in the counter-examples was also lesser than that of the polymers of the invention.

Preparation of the Pulp

The pulp used was composed of virgin fibres. The paper pulp was prepared by disintegrating 60 grams of recycled fibres for 20 minutes in 2 litres of water. The pulp obtained was diluted to a total volume of 9 litres. After accurate measurement of consistency, the required amount of pulp was sampled to obtain a sheet having a grammage of 60 g/m². The tests were conducted with the pulp at pH 6.6.

Polymer Property Testing

Performance Under DSR Application (Dry Strength), Grammage of 60 g/m2

3/Dry Tensile Test

Breaking length was measured with AXM250 dynamometer testing system. The test was conducted in accordance with TAPPI standard 494 om-88.

4/Wet Tensile Test

Breaking length was measured with AXM250 dynamometer testing system. The test was conducted in accordance with TAPPI standard 456 om-87

Application Test 1

In the following example, the sheets of paper were produced according to the above procedure by adding the polymer in a proportion of 1.0 and 2.0 kg/T (dry polymer/dry fibre).

|  | Ref. | Example 1 (1 kg) | Example 1 (2 kg) | Counter-example 1 (1 kg) | Counter-example 1 (2 kg) | Counter-example 1 bis (1 kg) | Counter-example 1 bis (2 kg) |
|---|---|---|---|---|---|---|---|
| Grammage | 62.7 | 61.7 | 61.7 | 61.9 | 58.6 | 62.6 | 61.1 |
| Burst index | 3.13 | 3.68 | 4.21 | 3.64 | 3.98 | 3.70 | 3.90 |
| Improvement % |  | 18% | 34% | 16% | 27% | 18% | 25% |
| Dry tensile test (km) | 5.00 | 5.90 | 6.24 | 5.80 | 6.09 | 5.70 | 6.45 |
| Improvement % |  | 18% | 25% | 16% | 22% | 14% | 29% |
| Wet tensile test (km) | 1.80 | 2.42 | 2.62 | 2.39 | 2.57 | 2.34 | 2.57 |
| Improvement |  | 34% | 46% | 33% | 43% | 30% | 43% |

1/Sheet Formation

Paper handsheets were produced using an automatic dynamic handsheet former. The pulp is placed in the dynamic former tank, diluted to a consistency of 0.32 weight % and left under moderate mechanical agitation to homogenise the fibrous suspension. In manual mode, the pulp is pumped as far as the nozzle to prime the circuit. A blotter and the forming fabric are placed in the bowl of the dynamic former before setting the bowl in rotation at 1000 m/min and building the water wall. A polymer of PAE type (polyaminopolyamide-epichlorhydrin) was added at a metering rate of 3 kg/t sec. After 45 seconds, the polymer of Examples 1 to 3 or the counter-example was added to the fibrous suspension under agitation with a contact time of 45 seconds before adding a retention agent (FO 4190 PG10) in an amount of 150 g/t. The sheet was then produced (in automatic mode) via 22 nozzle sweeps, spraying the pulp into the water wall. After draining the water and completion of the automatic sequence, the forming fabric with the formed network of fibres was removed from the bowl of the dynamic former and placed on a table. A dry blotter was deposited on the side of the wet fibre mattress and pressed once with a roller. The assembly was turned over and the fabric gently separated from the fibrous mattress. A second dry blotter was deposited and the sheet (between the two blotters) was pressed once under a press applying 4 bars, then dried on a drying plate for 9 min at 107° C. Both blotters were then removed and the sheet stored overnight in a room under controlled humidity and temperature (50% relative humidity and 23° C.). The dry strength properties of all the sheets obtained with this procedure were evaluated.

2/Burst Test

The Burst index was measured with a Messmer Buchel M 405 testing machine (mean of 14 measurements). The test was conducted in accordance with TAPPI standard T403 om-91.

The above table shows improved performance of physical properties when the polymer of the invention is used. The polymers containing acrylic acid (Counter-examples 1, 1 bis and 2) exhibit lower performance.

Application Test 2

In the following example, the polymers of Examples 1 and 2 were compared with anionic polymers well-known to persons skilled in the art: carboxymethylcellulose (CMC) and anionic polyacrylamide (anionic PAM). The sheets of paper were produced according to the procedure already-cited. The PAE-type polymer was added in a proportion of 2 kg/t for each test.

|  | Ref. | CMC 1 kg/t | Anionic PAM 1 kg/t | Example 1 1 kg/t | Example 2 1 kg/t |
|---|---|---|---|---|---|
| Grammage | 63.03 | 62.29 | 61.58 | 60.53 | 62.26 |
| Burst index | 2.568 | 3.104 | 2.842 | 3.317 | 3.368 |
| Improvement % |  | 20.88% | 10.68% | 29.17% | 31.16% |
| Dry tensile test (km) | 4.423 | 5.043 | 4.809 | 5.309 | 5.396 |
| Improvement % |  | 14.02% | 8.73% | 20.03% | 22.00% |
| Wet tensile test (km) | 1.728 | 2.058 | 1.829 | 2.320 | 2.247 |

In this table, a distinct improvement can be seen when the polymer obtained with the method of the invention is used, compared with the polymers known to skilled persons.

Application Test 3

In the following example, the cationic polymer used for all the sheets was a glyoxalated cationic polymer in a proportion of 2 kg/t (this polymer replaced the PAE in Application test 2).

|  | Ref. | CMC 1 kg/t | PAM Anionique 1 kg/t | Exemple 1 1 kg/t | Exemple 2 1 kg/t | contre-exemple 1 1 kg/t |
|---|---|---|---|---|---|---|
| Grammage | 64.16 | 64.4 | 64.8 | 63.72 | 63.11 | 63.99 |
| Burst index | 2.498 | 2.980 | 3.040 | 3.345 | 3.413 | 3.222 |
| Improvement % |  | 19.31% | 21.72% | 33.94% | 36.66% | 28.99% |
| Dry tensile test (km) | 4.459 | 5.006 | 4.985 | 5.271 | 5.513 | 4.585 |
| Improvement % |  | 12.27% | 11.80% | 18.21% | 23.64% | 2.83% |
| Wet tensile test (km) | 0.703 | 1.020 | 1.244 | 1.376 | 1.494 | 1.227 |

In this table a distinct improvement can be seen when the polymer obtained with the method of the invention is used, even though the cationic polymer is of different type (glyoxalated cationic polymer/PAE).

The invention claimed is:

1. A method for producing water-soluble anionic polymers in aqueous solution comprising successively:
   (a) polymerising anionic monomers, in aqueous solution, comprising at least 5 mol % of 2-acrylamido-2-methylpropane sulfonic acid and/or salts thereof and nonionic monomers to a concentration of polymer (A) of between 5 and 40 weight %, wherein the polymer (A) comprises between 5 and 30 mol % of anionic monomers and at least 5 mol % of 2-acrylamido-2-methylpropane sulfonic acid and/or the salts thereof, and between 70 and 95 mol % of at least one nonionic monomer;
   (b) adding at least one aldehyde to the solution obtained at (a) to perform a reaction between the aldehyde and the polymer (A); and
   (c) acidifying the solution obtained at (b) to a pH of between 3 and 4 to halt the reaction between the aldehyde and the polymer (A), and to obtain an aqueous solution of a water-soluble anionic polymer functionalized by an aldehyde.

2. The method according to claim 1, wherein the nonionic monomers are selected from the group consisting of acrylamide, methacrylamide, N,N dimethylacrylamide and acrylonitrile.

3. The method according to claim 1, wherein polymer (A) is a copolymer of acrylamide and 2-acrylamido-2-methylpropane sulfonic acid and/or the salts thereof.

4. The method according to claim 1, wherein for (b), 1 to 30 weight % of aldehyde is added, the aldehyde being selected from the group consisting of glyoxal, glutaraldehyde, furan-dialdehyde, 2-hydroxyadipaldehyde, succinaldehyde, dialdehyde starch, 2,2 dimethoxyethanal, diepoxy compounds, and combinations thereof.

5. The method according to claim 1, wherein for (b), the aldehyde is glyoxal.

6. The method according to claim 1, wherein polymer (A) is branched at (a) in the presence of a radical branching agent selected from the group consisting of methylenebisacrylamide (MBA), ethylene glycol diacrylate, polyethylene glycol dimethacrylate, diacrylamide, cyanomethyl acrylate, vinyloxyethyl acrylate, methacrylate, and triallylamine.

7. An aqueous solution of a water-soluble anionic polymer functionalised by an aldehyde obtained with the method according to claim 1 by reacting an aldehyde with a polymer (A) in aqueous solution and comprising between 5 and 30 mol. % of anionic monomers including at least 5 mol. % of 2-acrylamido-2-methylpropane sulfonic acid and/or the salts thereof, and between 70 and 95 mol. % of at least one nonionic monomer.

8. A method for producing a sheet of paper, cardboard or the like comprising, before or after formation of said sheet, contacting cellulose material with at least one additive, wherein said additive is an aqueous solution of a water-soluble anionic polymer according to claim 7.

9. The method according to claim 8, wherein the water-soluble anionic polymer is derived from the reaction between a copolymer (A) comprising between 5 and 30 mol. % of anionic monomers including at least 5 mol. % of 2-acrylamido-2-methylpropane sulfonic acid and/or the salts thereof, and between 70 and 95 mol % of acrylamide, and from 1 to 30 weight % of glyoxal.

10. The method according to claim 8, wherein the water-soluble anionic polymer is derived from the reaction between a copolymer (A) comprised of 5 to 30 mol % of 2-acrylamido-2-methylpropane sulfonic acid and/or the salts thereof, and 70 to 95 mol % of acrylamide, and from 1 to 30 weight % of glyoxal.

\* \* \* \* \*